United States Patent
Taniguchi et al.

[19]

[11] Patent Number: 6,057,519
[45] Date of Patent: May 2, 2000

[54] TRANSMISSION ELECTRONIC CONTROL UNIT INCLUDING NEUTRAL START SWITCH

[75] Inventors: Takao Taniguchi, Anjo; Nobuaki Miki, Ango; Ken Kiyama, Ango; Naotaka Murakami, Ango; Naoto Ogasawara, Ango; Toshiya Morishita; Takenori Kano, both of Anjo, all of Japan

[73] Assignee: Aisin AW Co., Ltd., Anjo, Japan

[21] Appl. No.: 08/980,063

[22] Filed: Nov. 26, 1997

[30] Foreign Application Priority Data

Nov. 29, 1996 [JP] Japan ..................... 8-333065
Nov. 29, 1996 [JP] Japan ..................... 8-333066

[51] Int. Cl.⁷ .............................. H01H 3/16; H01H 9/06
[52] U.S. Cl. ........................... 200/61.88; 200/61.91
[58] Field of Search ............... 200/61.85–61.91, 200/11 J, 11 G, 11 K, 564, 571

[56] References Cited

U.S. PATENT DOCUMENTS

| | | | |
|---|---|---|---|
| 3,939,313 | 2/1976 | Hayashi et al. | 200/11 J |
| 4,604,506 | 8/1986 | Gebhardt | 200/61.89 |
| 5,023,414 | 6/1991 | Mihara et al. | 200/61.91 |
| 5,101,677 | 4/1992 | Hammerschmitt | 74/473 X |
| 5,577,605 | 11/1996 | Dilly et al. | 200/564 |
| 5,679,937 | 10/1997 | Iwata | 200/61.88 |
| 5,693,925 | 12/1997 | Yamada et al. | 200/61.88 |
| 5,762,183 | 6/1998 | Iwata | 200/571 |
| 5,811,747 | 9/1998 | Taniguchi et al. | 200/61.88 |
| 5,969,313 | 10/1999 | Ikeshima et al. | 200/61.88 |

FOREIGN PATENT DOCUMENTS

| | | |
|---|---|---|
| 0-614-205-A2 | 9/1994 | European Pat. Off. . |
| 0-763-677-A1 | 3/1997 | European Pat. Off. . |
| 63-150334 | 6/1988 | Japan . |
| 2-003741 | 1/1990 | Japan . |
| 5-70023 | 3/1993 | Japan . |
| 5-070023B | 10/1993 | Japan . |
| 07035225 | 2/1995 | Japan . |

*Primary Examiner*—J. R. Scott
*Attorney, Agent, or Firm*—Oliff & Berridge, PLC

[57] ABSTRACT

A control unit has an electronic control device that includes a base board on which a plurality of elements, including a microcomputer containing an automatic transmission program, are disposed. The electronic control device includes an integral neutral start switch connected to the microcomputer. The neutral start switch also includes a rotor and contact-type switches operated by rotation-of the rotor. The base board and the rotor are disposed in a case and are substantially parallel to each other at opposite sides of an intermediate wall formed in the case. The base board is separated from the contact-type switches by the intermediate wall to prevent communication of oil or metal dust from the contact-type switches to the base board.

21 Claims, 10 Drawing Sheets

TRANSMISSION ELECTRONIC CONTROL UNIT INCLUDING NEUTRAL START SWITCH

The entire disclosure of Japanese Patent Application Nos. Hei 08-333065 and Hei 08-333066 filed on Nov. 29, 1996, including the specification, drawings and abstract is incorporated herein by reference in its entirety.

BACKGROUND OF THE INVENTION

1. Field of Invention

The invention relates to a control unit of an automatic transmission and, more particularly, to a control unit integrally combining a neutral start switch mounted on an automatic transmission main body and an electronic control device for transmission control.

2. Description of Related Art

Conventional automatic transmissions use an electronic control device to control a hydraulic pressure control device incorporated in the automatic transmission main body so as to automatically perform speed-shift within a range selected by the driver. The automatic transmission main body and the electronic control device are installed in separate locations of a vehicle and undergo thorough quality control as separate components. Quality control processes are also required when these components are connected and finally installed in the vehicle to ensure that they perform as desired. Because the connection between the automatic transmission main body and the electronic control device is performed at the stage of installation in a vehicle, it is impossible to "de-bug" or adjust the control of the one-to-one correspondence between the automatic transmission main body and the electronic control device before the installation stage. Therefore, it is necessary to adjust the automatic transmission and the counterpart electronic control device so that they conform to each other after they are installed in a vehicle. Accordingly, many manhours are required to perform the difficult task of quality control for automatic transmissions.

In addition, because the two components are installed in different locations in the vehicle, a long wire harness is needed to connect the components, thereby increasing the susceptibility to electromagnetic noise and requiring a labor intensive wiring arrangement. Further, significant space for wiring is also required. Thus, for the reasons stated above, the process for ensuring total quality control for automatic transmissions faces various problems.

Attempts have been made to solve the aforementioned problems by combining an automatic transmission main body and an electronic control device into a single unit. As an example of such attempts, Japanese Patent Publication No. Hei 5-70023 discloses an apparatus in which an automatic transmission main body and an electronic control device are integrally combined by incorporating the electronic control device into a case of a neutral start switch. The neutral start switch is conventionally disposed on an automatic transmission casing for outputting an electric signal to the electronic control device indicating a range position as selected by a driver of the vehicle.

However, the neutral start switch not only provides an electric signal output to the electronic control device for indicating a driving range position, but also switches drive circuits on and off for driving the starter motor and turning on the reverse lamp and similar devices. That is, the neutral start switch inevitably performs operations for contacting and separating a stationary contact and a movable contact by mechanical switching actions. Therefore, production of metal dust by the abrasion between contacts that slide on each other is inevitable. To reduce such abrasion and operating resistance, grease is normally applied to the contacts. However, because electrical arcs are produced when mechanical contacts come into and out of contact with each other, grease or metal dust or a mixture thereof is often scattered by the arcs. The scattered metal dust and grease deposit and accumulate on the circuit base board of the electronic control device and, therefore, smear and damage the base board such that circuit operation is adversely affected. Presently, the industry lacks a device that addresses this problem and, therefore, no particular measure for solving the problem is known in the art.

SUMMARY OF THE INVENTION

Accordingly, it is a first object of the invention to protect a base board of an electronic control device from contaminants such as scattered debris caused by the switching actions of switch contacts in an automatic transmission. This protection is especially important in devices in which the electronic control device is integrated with the neutral start switch.

It is a second object of the invention to reduce a dimension, for example a radial dimension of the neutral start switch portion to reduce the size of the entire control unit while achieving the first object.

It is a third object of the invention to reduce the thickness of the neutral start switch portion and, thereby, reduce the size of the entire control unit while achieving the first object.

It is a fourth object of the invention to prevent electromagnetic effects caused by actions of the drive circuit contacts of the neutral start switch from affecting the electronic control device while achieving the first object.

It is a fifth object of the invention to achieve accurate correspondence of the actions of the drive circuit contacts with the actions of the position signal contacts while achieving the fourth object.

It is a sixth object of the invention to reduce the length of wire between the neutral start switch and the electronic control device while achieving the fourth object.

It is a seventh object of the invention to simplify the wiring arrangement between the neutral start switch and the electronic control device while achieving the first object.

It is an eighth object of the invention to prevent leakage of oil from a case containing the electronic control device while achieving the seventh object.

It is a ninth object of the invention to keep the electronic control device at a low temperature and improve maintenance characteristics of the electronic control device while achieving the seventh object.

It is a tenth object of the invention to reduce the thickness of the entire control unit while achieving the seventh object.

It is an eleventh object of the invention to reduce a widthwise dimension of the entire control unit while achieving the tenth object.

According to an embodiment of the invention, there is provided a neutral start switch-combined electronic control unit including an electronic control device having a microcomputer that contains an automatic transmission control program. The neutral start switch is integrated with the electronic control device and inputs to the electronic control device a select position signal for transmission control. The electronic control device has a base board on which a plurality of elements, such as electronic circuitry elements, are disposed. The neutral start switch has a rotor and a contact operated by rotation of the rotor. The base board and the rotor are disposed in a case and are substantially parallel to each other at opposite sides of an intermediate wall formed in the case. The base board is sealed tightly from at least the contacts by the intermediate wall to prevent communication of oil, metal particles and other contaminants between the contacts and the base board.

The invention solves various problems arising from the separate installation of the automatic transmission and the electronic control device at different locations. Because the base board is completely separated from the contacts of the neutral start switch by the intermediate wall, the operation of the neutral start switch will not adversely affect the electronic control device.

The contacts of the neutral start switch may be disposed on both side surfaces of the rotor. In this alternative structure, the length of the neutral start switch portion in a radial direction extending along the rotor from a sleeve shaft portion is reduced. Accordingly, the entire control unit, that is, the assembly of the neutral start switch and the electronic control device, can be reduced in size.

The contacts of the neutral start switch may also be disposed on a single surface of the rotor. In this structure, the thickness of the neutral start switch portion can be reduced. Subsequently, the entire assembly of the control unit can be made smaller.

The contacts of the neutral start switch may include a position signal contact and a drive circuit contact. At least the drive circuit contact is disposed at a side of the rotor opposite from the base board. Because the base board is disposed apart from the drive circuit contacts, the drive circuit contacts are buffered from electronic noise. The electronic noise is a result of changes in magnetic fields caused by large current changes occurring due to switching action of the drive circuit contacts. Accordingly, noises that may affect the signals of the electronic control device are reduced, thereby improving the reliability of operation of the electronic control device.

The drive circuit contacts may be disposed at a radially outward side of the rotor and within a range of locus of rotation of the rotor. Because the length in the circumferential direction relative to the rotating angle of the rotor is correspondingly increased, the position of each of the contacts can be more precisely set, thereby achieving more precise operation of a starter motor or a reverse lamp in response to the selection of a predetermined range.

The position signal contacts may be disposed between the intermediate wall and the rotor. Because the position signal contacts, which essentially require connection to the electronic control device, are disposed closer to the base board, the wire that connects the electronic control device with the position signal contacts can be reduced in length, thereby correspondingly reducing the cost and the possibility of noise contamination in the wiring.

The case may include an electronic control device case for housing the base board, and a switch case for housing the rotor. The electronic control device case forms a portion of the switch case. The wiring between the base board and the position signal contacts does not need to extend through both cases. Accordingly, the manhours required for wiring can be correspondingly reduced and, at the same time, electrical connection failure can be eliminated.

The neutral start switch-combined electronic control unit of the invention may further include a manual shaft connected to the rotor. The manual shaft is connected at one end to a shift lever and at another end to a manual valve, and extends through only the switch case. Because no movable member extends from outside to inside the electronic control device case, it is easier to water-proof the electronic control device case. Furthermore, the electronic control device case is disposed apart from the automatic transmission casing so that the heat of the automatic transmission casing will not significantly heat the microcomputer or similar device in the electronic control device. Because the electronic control device case is disposed at the side of the switch case opposite from the automatic transmission casing, the base board can be easily replaced if a failure occurs in the electronic control device, thereby improving maintenance operability.

The neutral start switch-combined electronic control unit of the invention may include an electronic control device case and a switch case which have overlapping portions that overlap each other within a range corresponding to the locus of rotation of the rotor and in a direction of an axis of the rotation of the rotor. Relatively short elements may be disposed on a portion of a surface of the base board facing the overlap portions of the electronic control device case and the switch case. Relatively tall elements may be disposed on a portion of a surface of the base board located outside the overlapping portions. The overlapping portions of the rotor and the base board that inevitably overlap each other in the axial direction can be made as thin as possible. Because the thickness of the overlapping portions can be reduced to a level comparable to the thickness of other portions, the thickness of the entire assembly of the control unit can be reduced.

Circuit elements may be disposed on both side surfaces of the base board. Accordingly, the base board thickness can be reduced, resulting in reduced width of the control unit assembly.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described in detail hereinafter with reference to the accompanying drawings.

FIGS. 1–11 illustrate a first embodiment of the invention. As shown in the sectional view of FIG. 1, an electronic control device (ECU) is integrally combined with a neutral start switch (NSW) and has a case 10, a rear cover 20, a front cover 30, a rotor 40 and a circuit base board 50. These components and the relationship between these components will be described in detail hereafter in sequential order.

Case 10 is formed of a resin material having good electrical insulating property. As shown in the front elevational view of FIG. 2 and the rear elevational view in FIG. 3, the case 10 is formed by combining a rear-side fan-shaped switch case 11, and a front-side rectangularly-shaped electronic control device case 12. An intermediate wall 13 (see FIG. 1) prevents oil and other possible contaminants from communicating between cases 11 and 12. The switch case 11 of the case 10 is disposed so that a portion of the switch case 11 corresponding to the pivot of a fan is shifted from the electronic control device case 12. The electronic control device case 12 and the switch case 11 have overlapping portions 10a that overlap each other within a range corresponding to the locus of rotation of the rotor 40, when viewed in the direction of the axis of the rotation. In FIG. 2, the overlapping portions 10a are shown in a front view wherein they have a generally rectangular shape in which the bottom side and vertical sides are straight and the upper side forms an arc. The case 10 has a stepped hole 19 at a position corresponding to the pivot of a fan. The stepped hole 19 is formed so that a sleeve shaft portion 43 (see FIG. 1) of the rotor 40 can be rotatably inserted into the stepped hole 19, and so that an oil seal 6 (see FIG. 1) can be fitted for sealing around the sleeve shaft portion 43. Therefore, the sleeve shaft portion 43 does not extend inside the electronic control device case 12. The electronic control device case 12 has connector sockets 14, 15 for transmitting and receiving signals. The connector sockets 14, 15 protrude from two sides of the rectangular-shaped electronic control device case 12. The connector sockets 14, 15 are formed together with the electronic control device case 12. A pair of flanges 16 carrying bolt-insert holes for fixing the case 10 to an automatic transmission casing c (see FIG. 1) protrude from diagonally opposite portions of the electronic control device case 12.

The rear cover 20 is formed of the same type of material as the case 10. As shown in the internal view of FIG. 4, the rear cover 20 has a fan shape that conforms to the external shape of the switch case 11. The cover 20 may be fitted and fixed in position to the switch case 11 by a socket-and-spigot coupling. The rear cover 20 has a stepped hole 21 at a position corresponding to a pivot portion of the fan shape for inserting the sleeve shaft portion 43 of the rotor 40 and for retaining an oil seal 6. A projected connector socket 22 is formed together with the rear cover 20. A peripheral edge surface of the rear cover 20 that meets the switch case 11 of the case 10 has a seal ring groove 23 into which an O-ring extending around the entire periphery of the rear cover 20 is fitted.

The front cover 30 is formed from a good heat-conductive material, such as aluminum, and shaped as a rectangular plate. As shown in an exterior view, an interior view and a side view in FIGS. 5–7, respectively, many parallel-extending heat-radiating fins 31 project from the external surface of the front cover 30 by unitary molding. A heat-conducting protrusion 32 also projects from the internal surface of the front cover 30 by unitary molding. An internal peripheral edge surface of the front cover 30 that meets the electronic control device case 12 of the base 10 has a seal ring groove 33 into which an O-ring extending around the entire periphery of the front cover 30 is fitted. A plurality of mounting flange portions 34 project from the peripheral edge of the front cover 30. The front cover 30 can be fastened to the front side of the case 10 by screws inserted through the mounting flange portions 34.

The rotor 40 may be formed from the same kind of material as the case 10. As shown in a front view, a side sectional view and a rear view in FIGS. 8–10, respectively, the sleeve shaft portion 43 of the rotor 40 integrally connects to an end of an arm portion 41 of the rotor 40. The sleeve shaft portion 43 has a hole 42 through which a manual shaft is inserted. Rectangular block-shaped conductors 45a–45f are elongated in the direction of the radius of the arm portion 41, and are embedded in the front and rear surfaces of the arm portion 41 in such a manner that the conductors 45a–45f can be moved in the direction of the axis of the sleeve shaft portion 43. A coil spring is disposed behind each block-shaped conductor for pressing the conductor and retaining it in an outward position. Four conductors 45a–45d are located and aligned on the front surface of the arm portion 41 in pairs in radial directions and are shifted from one another in position in a circumferential direction. Two conductors 45e, 45f are located and aligned on the rear surface of the arm portion 41 in a direction of the radius of the arm portion 41. Radially inward portions of the conductors 45a, 45c overlap radially outward portions of the conductors 45b, 45d in a circumferential direction.

Figure 8:
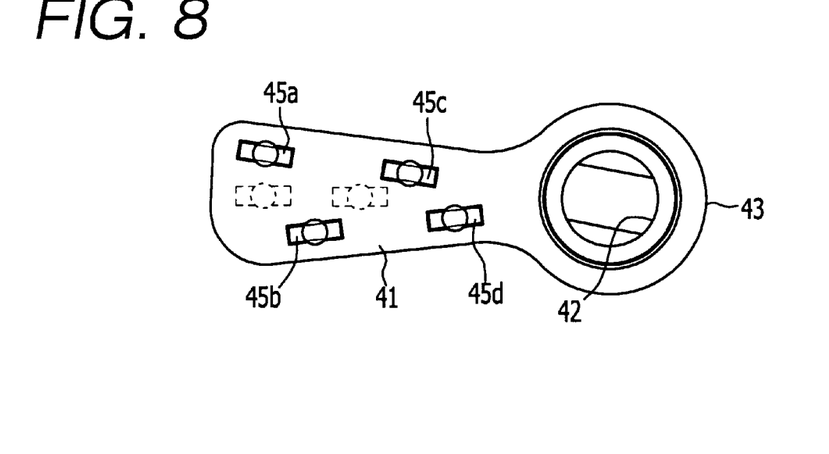
FIG. 8 is a front elevational view of a rotor in accordance with the embodiment of the invention.
Figure 9:
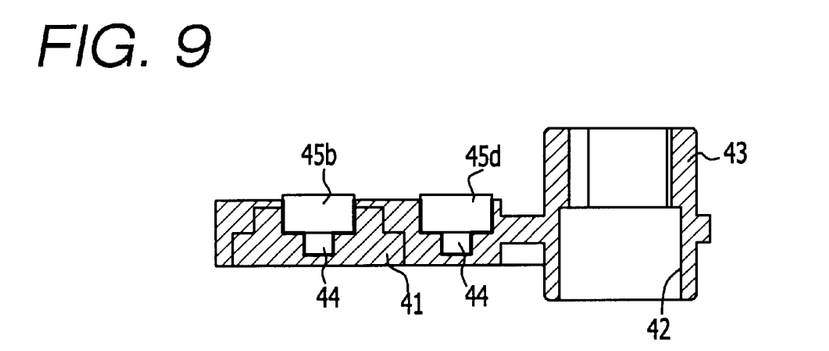
FIG. 9 is a side sectional view of the rotor in accordance with the embodiment of the invention.
Figure 10:
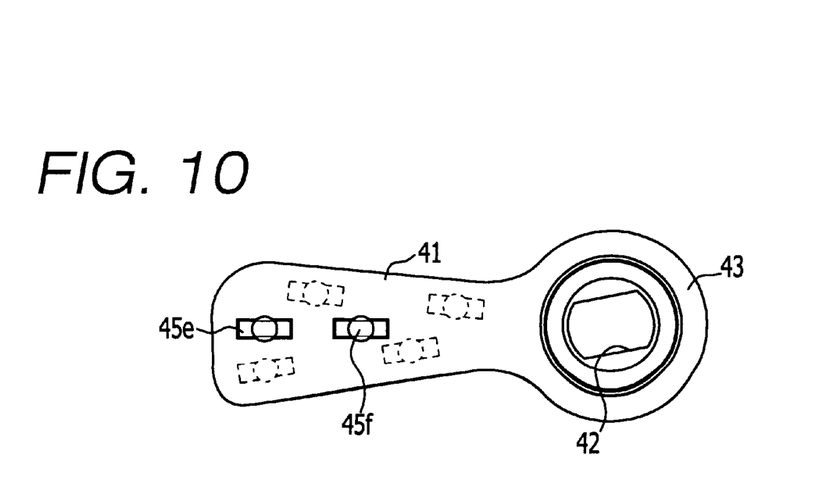
FIG. 10 is a rear elevational view of the rotor in accordance with the embodiment of the invention.

A half-length portion of the hole 42 of the sleeve shaft portion 43 in the direction of the axis of the hole 42 is cylindrical, and the other half-length portion thereof has a shape wherein opposite side surfaces extend from opposite cylindrical inner peripheral surfaces to form parallel surfaces and, thereby, provide a reduced width between the parallel side surfaces. The rotor 40 is mounted by rotatably fitting the sleeve shaft portion 43 into the stepped hole 19 of the case 10 and the stepped hole 21 of the rear cover 20 in such a manner that the arm portion 41 is sandwiched between the case 10 and the rear cover 20. Accordingly, the rotor 40 is disposed in a space defined by the case 10 and the rear cover 20. Gaps between the peripheral surface of the sleeve shaft portion 43 and the stepped holes 19, 21 are sealed by the oil seals 6. The aforementioned space contains an electrically-insulating grease that serves as a lubricant to prevent abrasion of drive circuit switch portions SW1, SW2 which output position signals. More specifically, the grease prevents abrasion of stationary contacts Pp, Ps, Ps', and conductors 45a–45f provided on the rotor 40.

Figure 1:
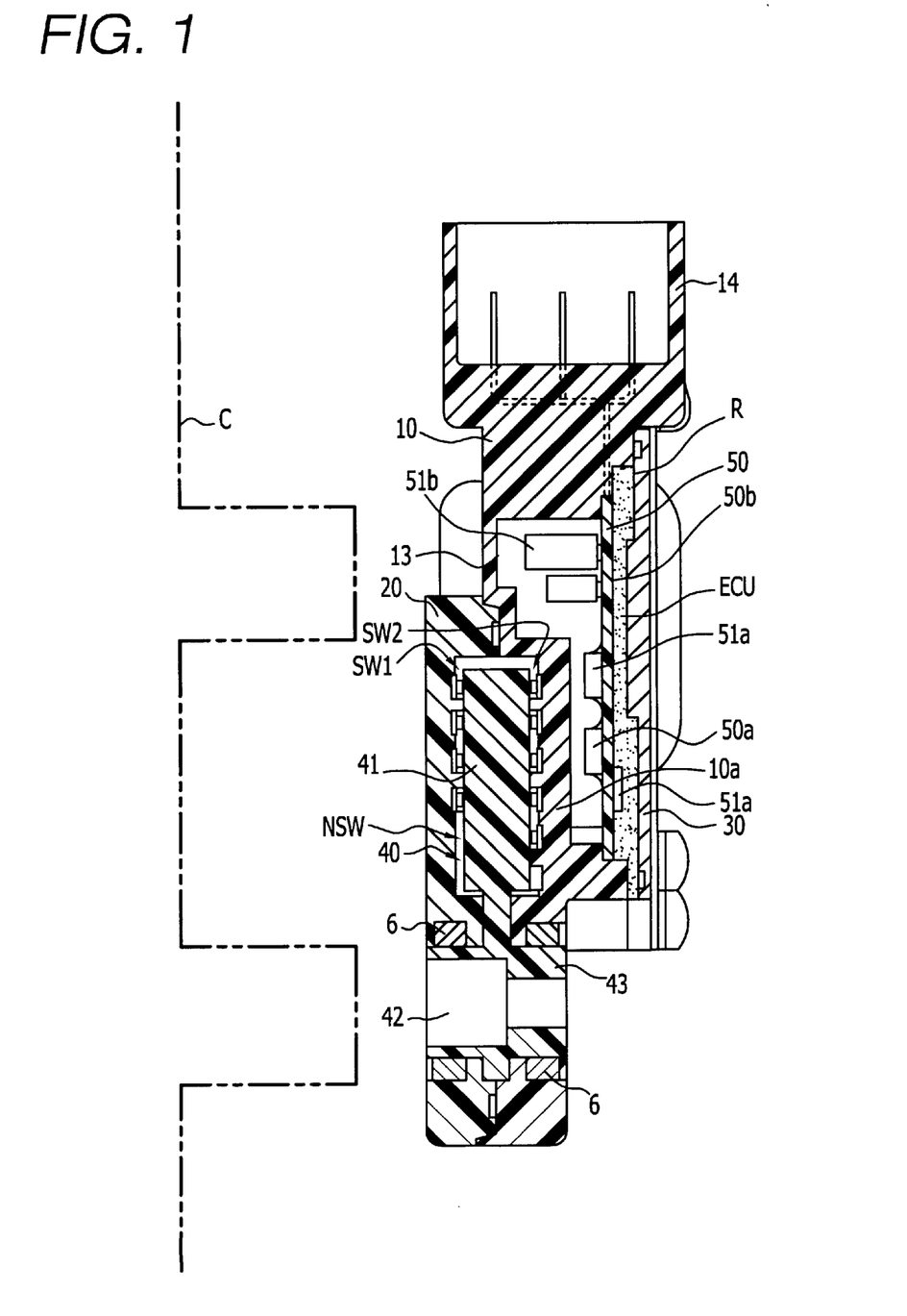
FIG. 1 is a sectional view illustrating the control unit in accordance with an embodiment of the invention.
Figure 2:
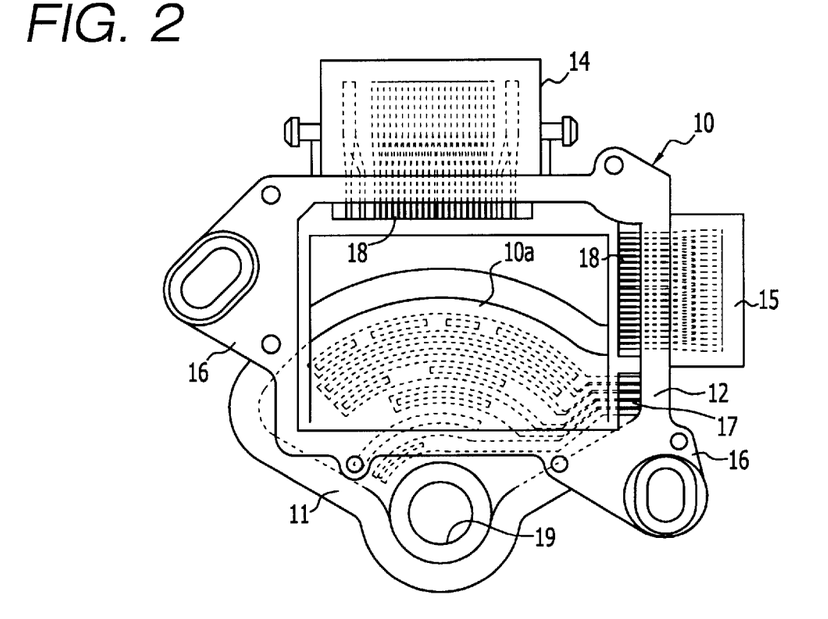
FIG. 2 is a front elevational view of a case in accordance with the embodiment of the invention.
Figure 3:
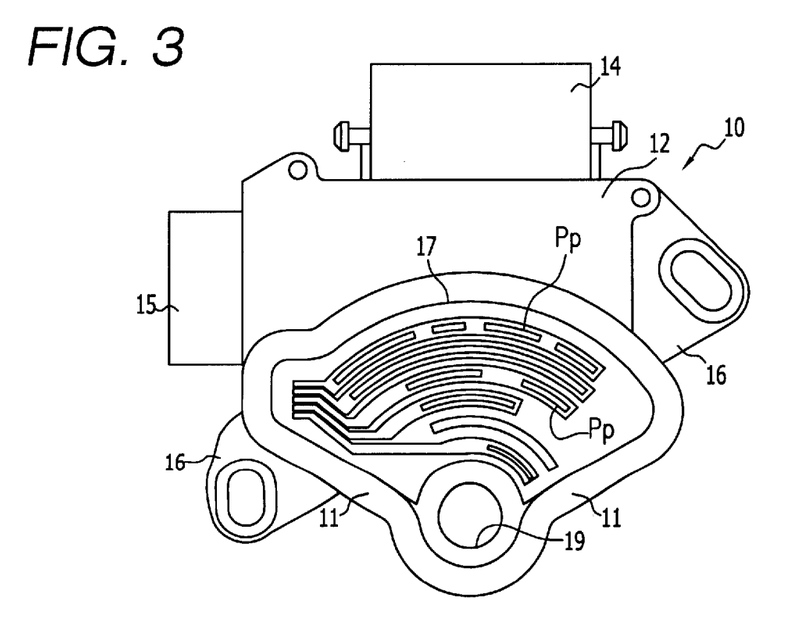
FIG. 3 is a rear elevational view of the case in accordance with the embodiment of the invention.
Figure 4:
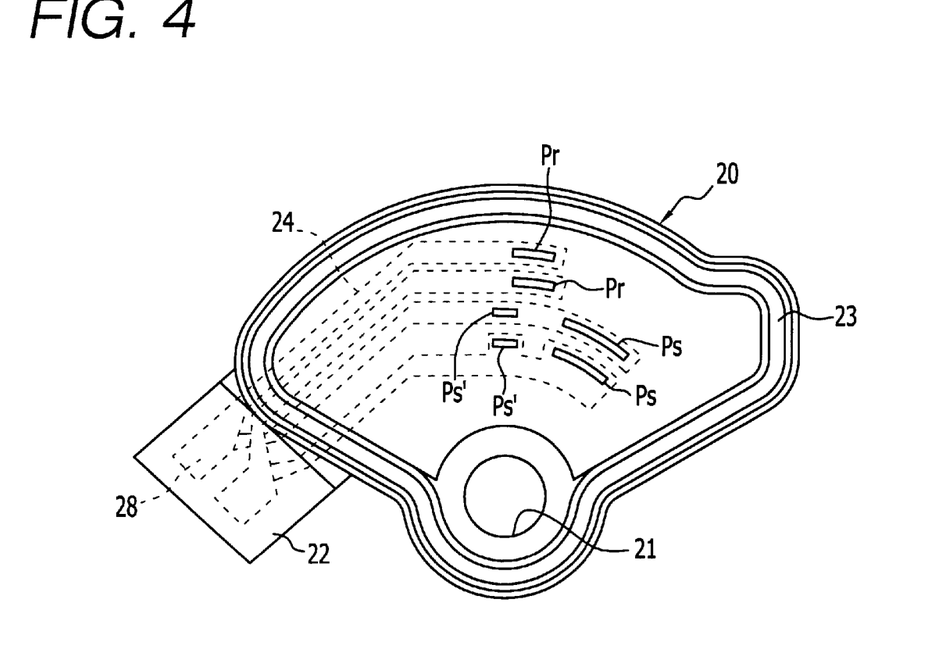
FIG. 4 is an internal view of a rear cover in accordance with the embodiment of the invention.
Figure 5:
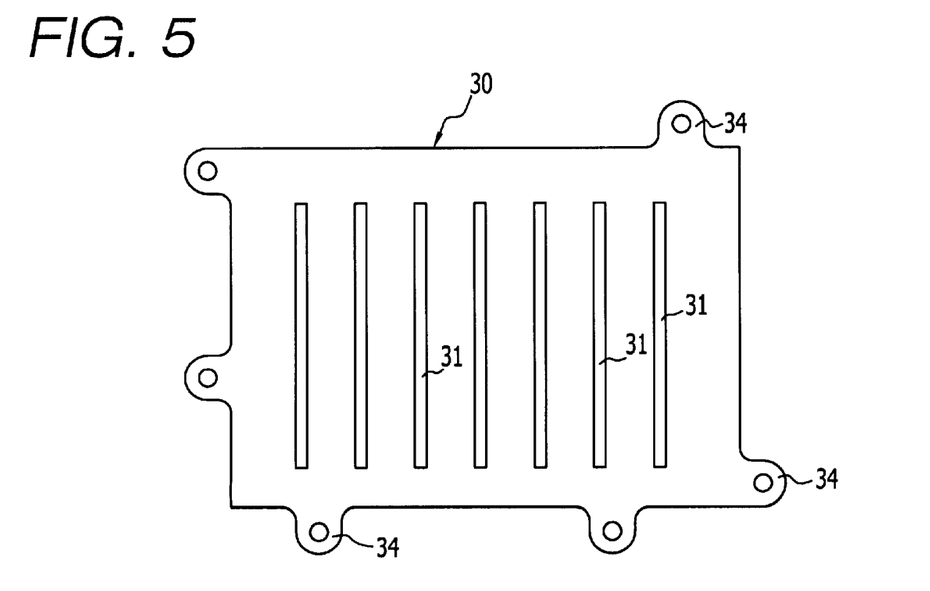
FIG. 5 is an external view of a front cover in accordance with the embodiment of the invention.
Figure 6:
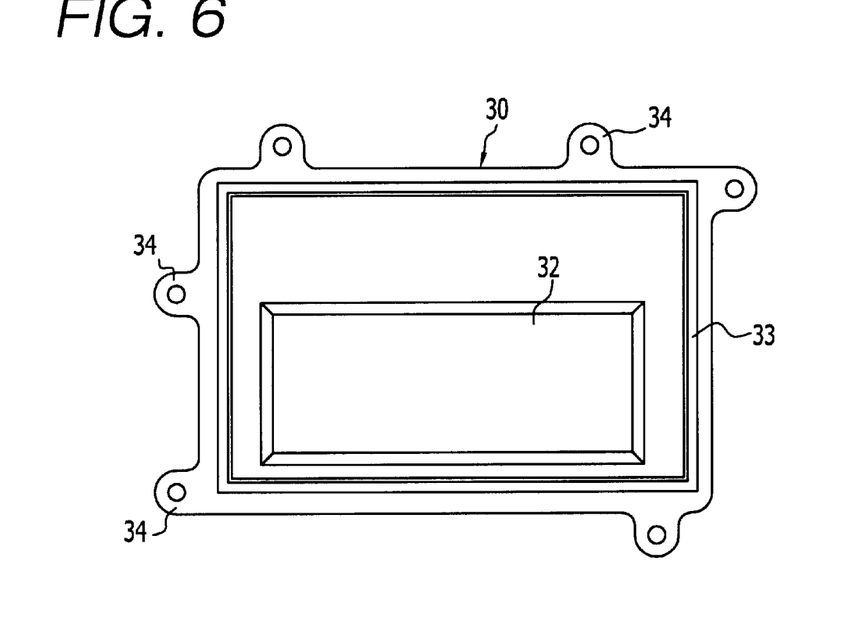
FIG. 6 is an internal view of the front cover in accordance with the embodiment of the invention.
Figure 7:
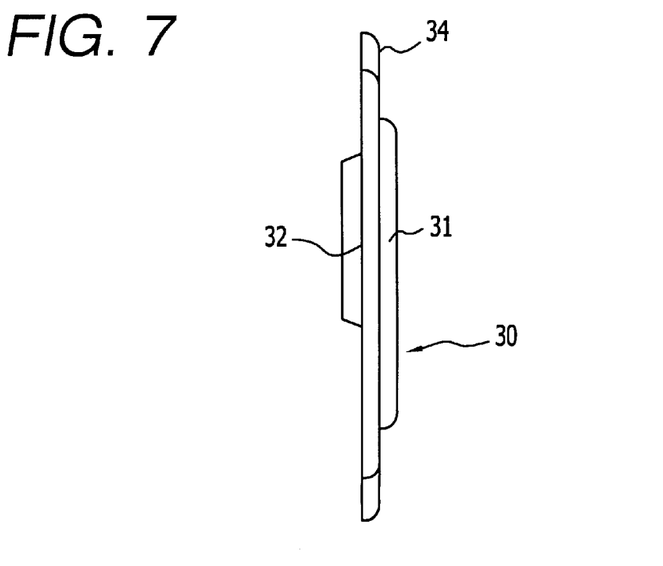
FIG. 7 is a side view of the front cover in accordance with the embodiment of the invention.

As shown in FIG. 1, the drive circuit switch portion SW1 is provided between the rotor 40 and the rear cover 20. The drive circuit switch portion SW1 is formed of two pairs of starter circuit contacts Ps, Ps' which are press-formed in belt-like connecting lines 24 embedded within the rear cover 20 and which are thereby exposed in the internal surface of the rear cover 20 as shown in FIG. 4. The drive circuit switch portion SW1 includes a pair of reverse lamp lighting circuit contacts Pr, and conductors 45e, 45f, which are fixed to the arm portion 41 of the rotor 40 and interconnect the pairs of contacts. In this embodiment, the connecting lines 24 extend directly to the interior of the connector socket 22, where they form connector terminals 28. Thus, the connecting lines 24 form, within the rear cover 20, a circuit extending from the connector terminals 28 and returning thereto. This circuit is a complete circuit that is separate from the case 10 and only extends within the rear cover 20.

The position signal switch portion SW2 is formed between the rotor 40 and the intermediate wall 13. In this embodiment, the position signal switch portion SW2 is formed of many contacts Pp which are press-formed in belt-like connecting lines 17 fixed to an internal surface of the switch case 11 of the case 10. The switch portion SW2 also includes conductors 45a–45d fixed to the arm portion 41 of the rotor 40. The connecting lines 17 carry the contacts Pp and extend through the intermediate wall 13 of the case 10 to a base board connecting pad portion provided in the electronic control device case 12. In the pad portion, the connecting lines 17 are connected to terminal portions of the base board 50 by wire bonding or any other known method. Thus, the connecting lines 17 directly connect the neutral start switch (NSW) and the electronic control device (ECU) within the case 10.

The base board 50 of the electronic control device is formed of a ceramic material or similar material having an excellent heat resistance. As well known, various circuit elements, such as microcomputer chips, transistors, resistors, capacitors and similar devices can be arranged on a printed circuit formed on the surfaces of the base board 50. The base board 50 is fixed in position by contacting a stepped portion in the case chamber 12. The base board 50 is connected, in the pad portion, to groups of terminal connecting lines 18 of the two connector sockets 14, 15 by wire bonding or other known connection method. The groups of terminal connecting lines 18 extend in the case 10 to the interior of the respective connector sockets 14, 15, forming connection terminals therein. The connector sockets 14, 15 are connected to various sensors and solenoid valves in a hydraulic pressure control device disposed in the automatic transmission main body, and to sensors and an engine control device disposed in various parts of the vehicle.

The base board 50 is disposed so that the board surface is parallel to the plane of rotation of the rotor 40. The base board 50 has an overlap portion 50a substantially corresponding to the overlap portions 10a, which overlap each other in the direction of the rotating axis of the rotor. The overlap portion 50a of the base board 50 overlaps the locus of rotation of the rotor 40 when viewed in a direction of the axis of rotation of the rotor 40, that is, a direction perpendicular to the board surface and the plane of rotation. Among a plurality of elements disposed on the base board 50, relatively short elements 51a, such as resistors, are disposed on the obverse and reverse sides of the overlap portion 50a. Relatively tall elements 51b, such as capacitors, are disposed on a board portion 50b other than the overlap portion 50a. A gap between the base board 50 and the front cover 30 is filled with a highly heat-conductive resin R to eliminate any air layer. Accordingly, conduction of heat generated in the base board 50 to the front cover 30 is facilitated to allow the front cover 30 to serve as a heat-radiating plate.

The above-described arrangement of this embodiment solves the various problems arising from the installation of an automatic transmission and an electronic control device apart from each other. In particular, because the base board 50 is completely separated from the contacts of the neutral start switch (NSW) by the intermediate wall 13, the operation of the neutral start switch (NSW) does not adversely affect the electronic control device (ECU).

Furthermore, the neutral start switch (NSW) has a reduced size in the direction of a radius so that the assembly of the neutral start switch (NSW) and the electronic control device (ECU) can be reduced in size. Further, because the base board 50 is disposed apart from the drive circuit contacts Ps, Ps', Pr, changes in magnetic fields caused by large current changes occurring due to the switching actions of the drive circuit contacts is prevented. Accordingly, noises that may affect the signals of the electronic control device (ECU) are reduced, thereby improving the reliability of operation of the electronic control device. Furthermore, the drive circuit contacts Ps, Ps', Pr are disposed at a radially outward side within the range of locus of rotation of the rotor 40. Because the switching stroke of the contacts relative to the rotating angle of the rotor 40 is increased as compared with the case where the contacts are disposed at a radially inward side, it is possible to conform the switching timing of the drive circuit contacts Ps, Ps', Pr to the switching timing of the position signal contacts Pp with high precision. Therefore, the invention prevents deviation in the operating timing of the starter motor and the reverse lamp, for example, which are operated by the switching actions of the drive circuit contacts.

Further, the position signal contacts Pp, which require connection to the base board 50, are disposed close to the base board 50, so that the wire connecting the base board 50 and the position signal contacts Pp can be reduced in length. Accordingly, the cost and the possibility of noise contamination in the wiring is reduced. Further, because it is unnecessary that the wiring between the base board 50 and the position signal contacts Pp extend in both cases 11, 12, the processing manhours required for wiring can be correspondingly reduced and, at the same time, connection failure can be eliminated.

The manual shaft S penetrates only the switch case 11 of the control unit, so that no movable member extends from outside to inside the electronic control device case 12. Accordingly, the electronic control device case 12 can be made water-tight. Furthermore, because the base board 50 is disposed on a side of the switch case 11 that is opposite from the automatic transmission casing C, the base board 50 can be easily replaced without detaching the control unit from the automatic transmission casing C if a failure occurs in the electronic control device (ECU). Accordingly, maintenance of the base board is facilitated.

Further, the overlap portions 10a of the rotor 40 and the base board 50, which inevitably overlap each other in the axial direction, can be made thinner. Because the thickness of the overlap portions 10a can be reduced to a level comparable to the thickness of other portions, the thickness of the entire control unit can be reduced. Further, because the dimensions of the base board 50 that are parallel to the board surface can be reduced, the width of the control unit can also be reduced.

Figure 11:
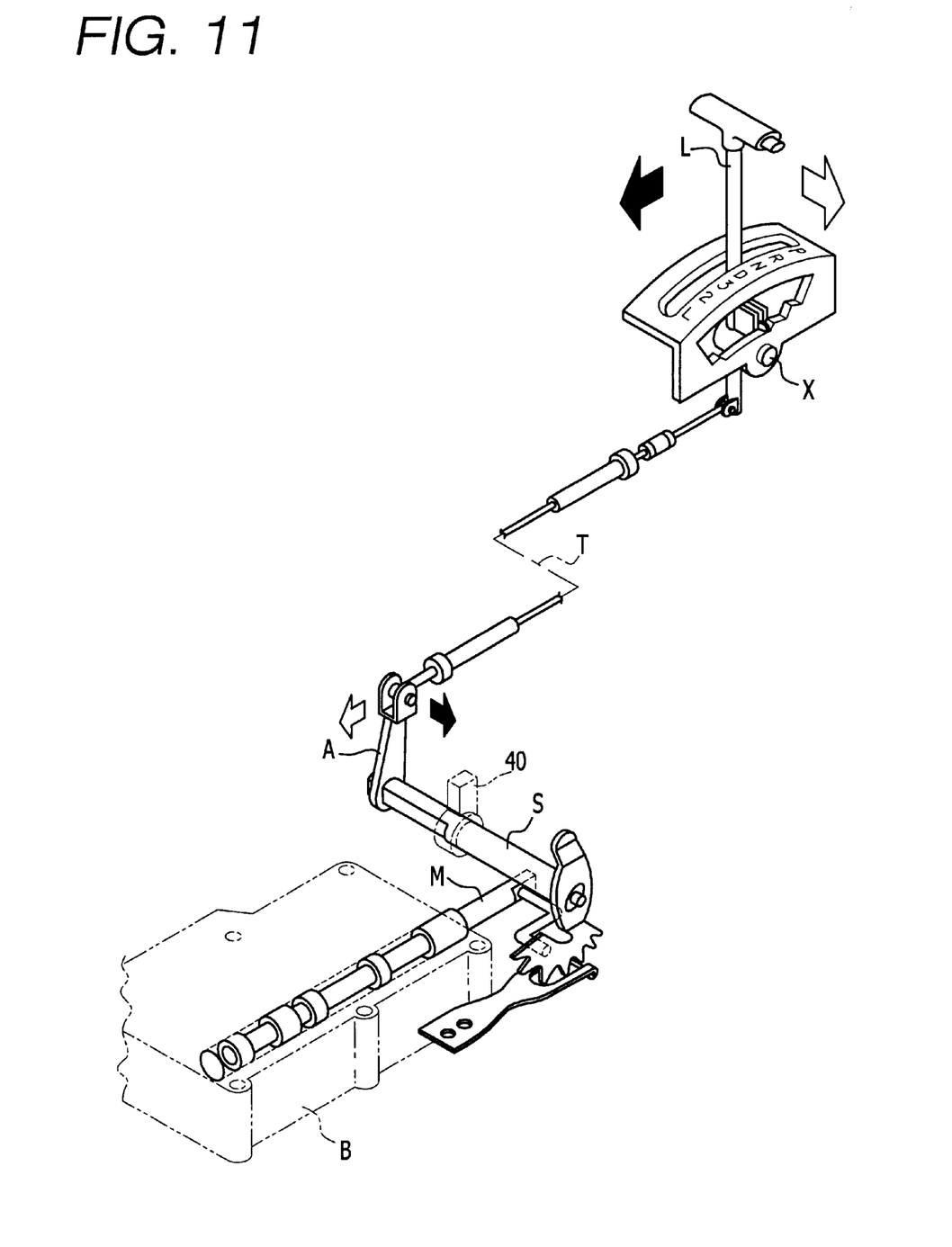
FIG. 11 is a diagram illustrating the connecting relationship between a shift device and an automatic transmission main body of the control unit in accordance with the embodiment of the invention.

The electronic control unit in accordance with the structure described above is fixed to the automatic transmission casing C as indicated in FIG. 1, and a turning motion of a shift lever L of a shift device around a shaft X is transmitted as understood from the relation among operating mechanisms schematically shown in FIG. 11. That is, a turning motion of the shift lever L is transmitted by a control wire T to an outer lever A of the automatic transmission main body, thereby turning the manual shaft S. The turning motion of the manual shaft S turns the rotor 40 (indicated by a phantom line in FIG. 11) connected to the manual shaft S. FIG. 11 shows a state where the shift lever L is at the neutral range "N" position. If the shift lever L is pushed forward from this position, that is, toward the reverse range "R" position or the parking range "P" position, the wire T is pushed, so that the outer lever A turns in a direction indicated by a blanked arrow in FIG. 11. If the shift lever L is pulled rearward, that is, toward the drive range "D" position, the third range "3" position, the second range "2" position or the low range "L" position, the wire T is pulled, so that the outer lever A turns in a direction indicated by a solid arrow in FIG. 11. Through such operation, the contacts of the neutral start switch are switched and, simultaneously, a manual valve M in a valve body B of the hydraulic pressure control device is slidingly switched.

At the neutral range "N" position and the parking range "P" position during the above-described operation, the starter contacts Ps, Ps' of the neutral start switch (NSW), shown in FIG. 4, are connected to the conductor 45e of the rotor 40. At the reverse range "R" position, the reverse contacts Pr are connected to the conductor 45f. Simultaneously, the position signal switch portion SW2 performs similar contact switching operations to output a corresponding neutral range "N" position signal, a parking range "P" position signal, and a reverse range "R" position signal, to the base board 50. At the drive range "D" position and the other range "3", "2" and "L" positions, only the position signal switch portion SW2 operates to output the corresponding position signals to the base board 50 through the connecting line 17.

Figure 12:
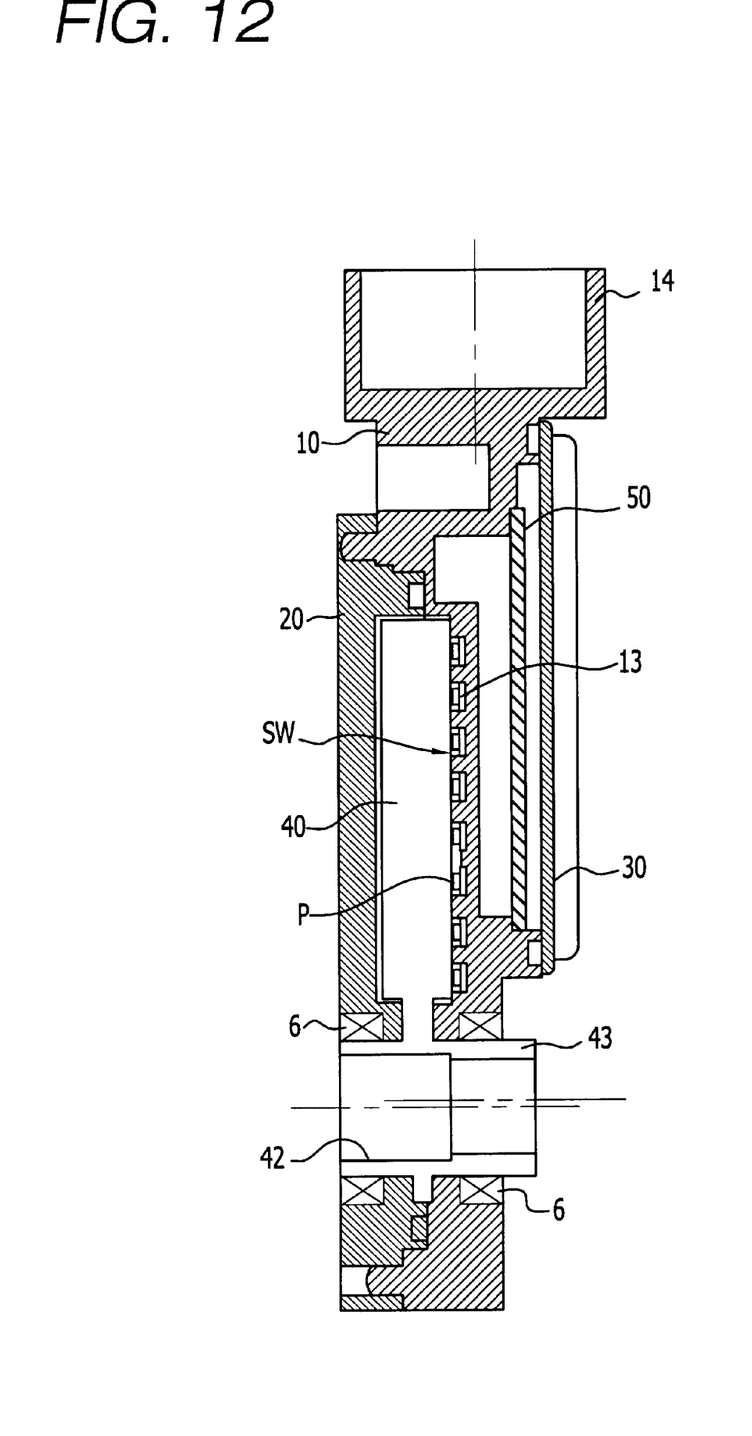
FIG. 12 is a side sectional view illustrating the control unit in accordance with a second embodiment of the invention.

FIG. 12 shows a second embodiment of the invention. This embodiment is distinguished from the first embodiment in that a switch portion SW is disposed at one side of the rotor 40. In the second embodiment, a neutral start switch (NSW) has contacts P which are embedded in an intermediate wall 13 corresponding to the rotation loci of conductors provided in the rotor 40, as in the first embodiment. The specific structure of each of the contacts and the conductors are substantially the same as those in the first embodiment. Other structures are also substantially the same as in the first embodiment and are represented by comparable reference characters in FIG. 12, and will not be described again.

Compared with the arrangement in the first embodiment, the arrangement in the second embodiment provides an increase in the area of the overlap portions 10a. If the area of the board surface of the base board 50 is unchanged, the space for installation of relatively tall elements is limited. However, the thickness of the rotor 40 can be reduced. Therefore, the thickness of the entire unit can be reduced. Furthermore, the strokes of the contacts at a radially outward side can be further increased.

Figure 13:
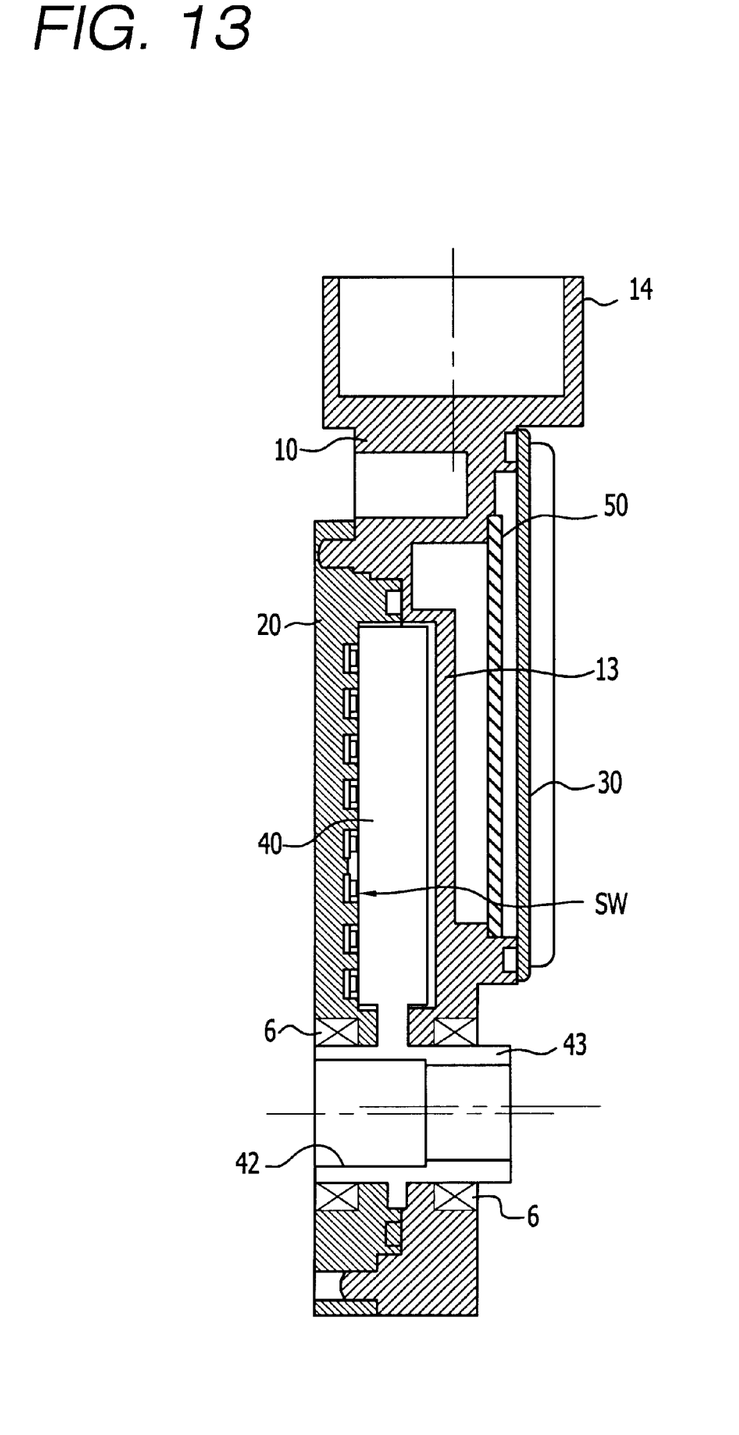
FIG. 13 is a side sectional view illustrating the control unit in accordance with a third embodiment of the invention.

FIG. 13 shows a third embodiment of the invention. This embodiment is similar to the second embodiment in that a switch portion SW is disposed at one side of a rotor 40, but distinguished in that parts of the switch portion SW are disposed in the rear cover 20. Other structures are substantially the same as those in the second embodiment, and are represented by comparable reference characters in FIG. 13, and will not be described again.

Large current changes created during the switching action of the switch contacts result in changes in magnetic field. Because the contacts are disposed remotely from the base board 50, the possibility that the changes in magnetic fields will create noise and affect the signals of the electronic control device (ECU) is reduced. Therefore, the second embodiment achieves an advantage of increasing the reliability of operation of the electronic control device (ECU).

Figure 14:
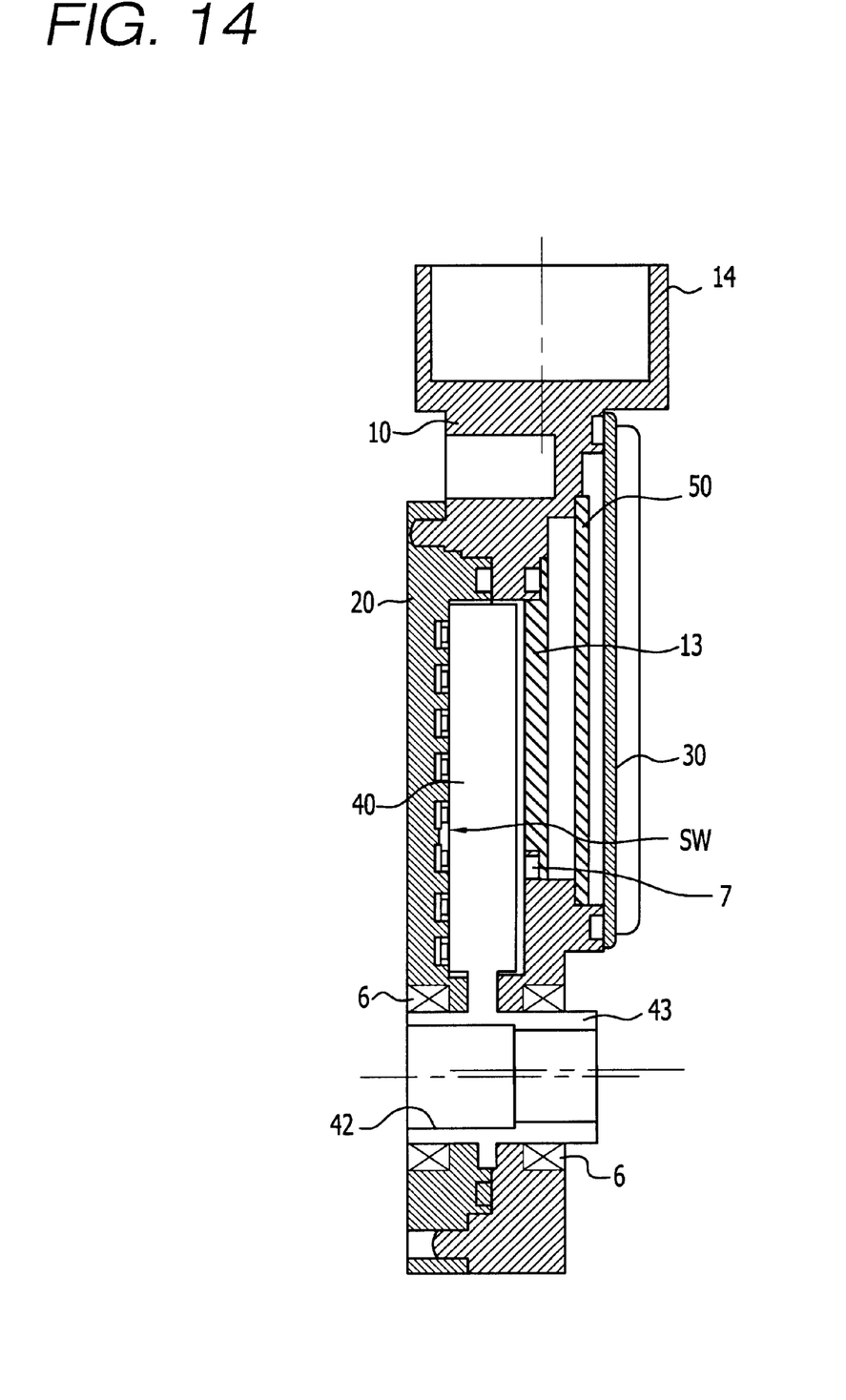
FIG. 14 is a side sectional view illustrating the control unit in accordance with a fourth embodiment of the invention.

FIG. 14 shows a fourth embodiment of the invention. This embodiment is similar to the third embodiment in that a switch portion SW is disposed at one side of a rotor 40 and includes parts disposed in a rear cover 20. The fourth embodiment of FIG. 14 is different from the third embodiment of FIG. 13 in that an intermediate wall 13 is provided separately from the case 12. Other structures are substantially the same as those in the third embodiment, and are represented by comparable reference characters in FIG. 14, and will not be described again.

Because the intermediate wall 13 is a separate member in this arrangement, a seal member 7 is required in order to prevent oil from communicating between the case 10 and the intermediate wall 13. However, because the separate intermediate wall 13 is not required to be made from electrically insulative material, the intermediate wall 13 can be formed of a material that is excellent in electromagnetic shielding, thereby blocking noise from interfering with the electronic circuit on the base board 50. Grease and abraded metal dust are also prevented from entering the electronic control device case 12 by the intermediate wall 13 and general configuration of the rotor 40.

Figure 15:
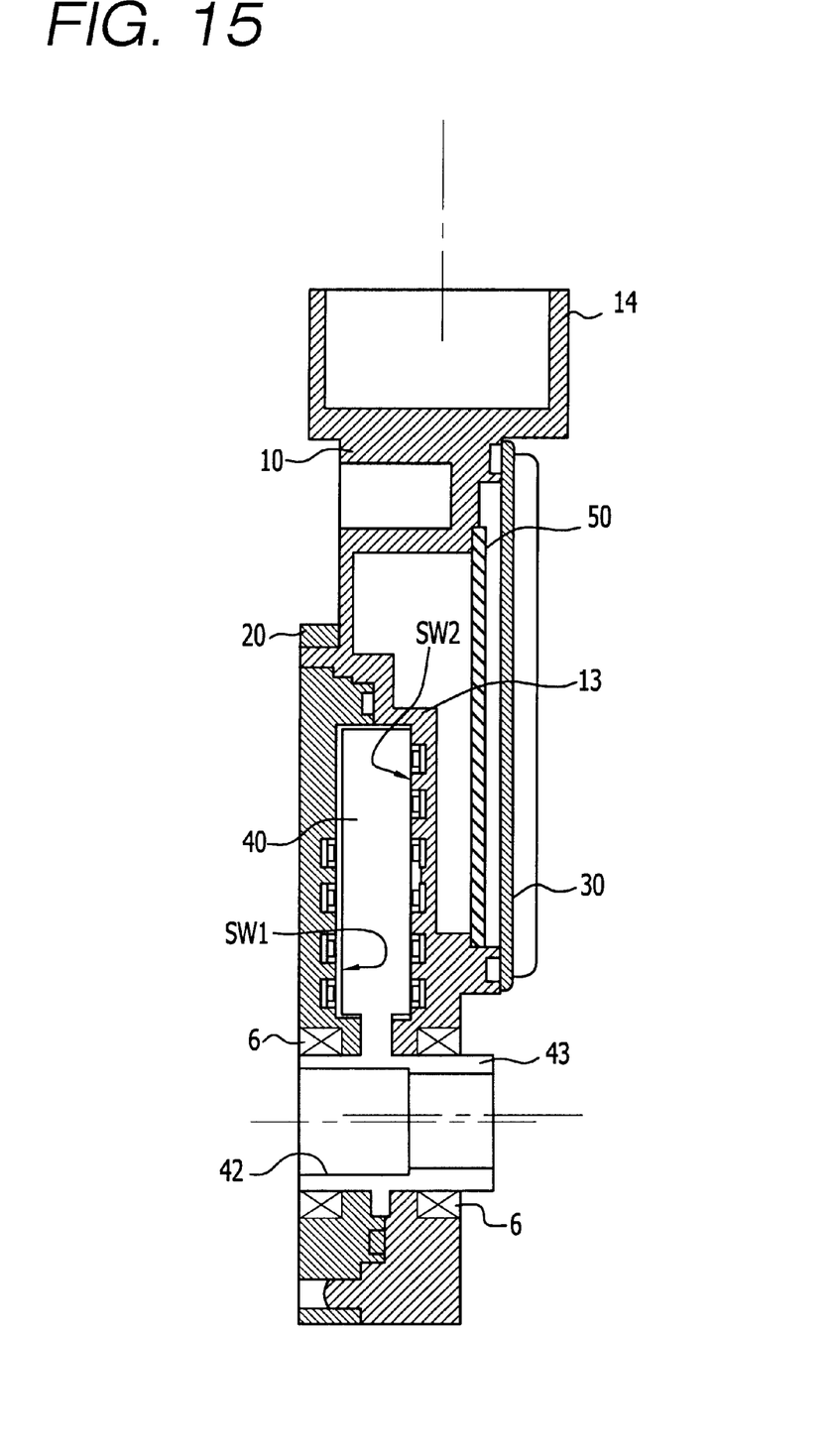
FIG. 15 is a side sectional view illustrating the control unit in accordance with a fifth embodiment of the invention.

FIG. 15 shows a fifth embodiment of the invention. This embodiment employs structures similar to that of the first embodiment, but differs in that each drive circuit contact is disposed toward a radially inward side within the locus of rotation of the rotor 40. The aim of this arrangement is to countermeasure electromagnetic noise by disposing the drive circuit contacts as far apart from the base board 50 as possible.

As understood from the above description, employment of any one of the foregoing embodiments provides various benefits over the conventional art, including: improving assembling operability; decreasing manhours required for wire arrangement; and facilitating quality control, for example. The above described benefits provide a solution to many conventional problems arising from installation of an automatic transmission and an electronic control device (ECU) at locations apart from each other, and substantially eliminate the adverse effects on the operation of the electronic control device (ECU) caused by metal dust produced by abrasion of the contacts Ps, Ps', Pr, Pp of the neutral start switch (NSW). Because the contacts of the neutral start switch (NSW) are completely separated from the base board 50 by the intermediate wall 13, metal dust and grease never reach the electronic control device.

While the invention has been described with reference to what are considered to be preferred embodiments thereof, it is to be understood that the invention is not limited to the disclosed embodiments or constructions. To the contrary, the invention is intended to cover various modifications and equivalent arrangements included within the spirit and scope of the appended claims.

What is claimed is:

1. A neutral start switch-combined electronic control unit comprising:

a case including an intermediate wall;

an electronic control device including a microcomputer that contains an automatic transmission control program, a plurality of elements, and a base board on which the plurality of elements are disposed;

a neutral start switch which inputs to the electronic control device a select position signal for transmission control, the neutral start switch being integrated with the electronic control device and having a rotor with at least one neutral start switch contact;

at least one contact located on a portion of the neutral start switch-combined electronic control unit, facing the rotor having the at least one neutral start switch contact, and operated by rotation of the rotor; and wherein the base board and the rotor are disposed in the case, substantially parallel to each other, and at opposite sides of the intermediate wall of the case, and the intermediate wall is configured to provide an oil-tight seal between at least the base board and the at least one contact.

2. A neutral start switch-combined electronic control unit according to claim 1, wherein the at least one neutral start switch contact comprises at least two neutral start switch contacts with at least one of the at least two neutral start switches positioned on each face surface of the rotor.

3. A neutral start switch-combined electronic control unit according to claim 1, wherein the at least one neutral start switch contact is on one face surface of the rotor.

4. A neutral start switch-combined electronic unit according to claim 1, wherein the at least one neutral start switch contact includes a position signal contact and a drive circuit contact, and at least the drive circuit contact being positioned on a face of the rotor located opposite from the base board.

5. A neutral start switch-combined electronic control unit according to claim 4, wherein the drive circuit contact is disposed at a radially outward side within a range of locus of rotation of the rotor.

6. A neutral start switch-combined electronic control unit according to claim 4, wherein the position signal contact is disposed between the intermediate wall and the rotor.

7. A neutral start switch-combined electronic control unit according to claim 1, wherein the case comprises an electronic control device case for housing the base board and a switch case for housing the rotor, and the electronic control device case forms a portion of the switch case.

8. A neutral start switch-combined electronic control unit according to claim 7, wherein a manual shaft connected to the rotor is connected at one end to a shift lever and at another end to a manual valve, and the manual shaft extends through only the switch case.

9. A neutral start switch-combined electronic control unit according to claim 7, wherein the case is located adjacent an automatic transmission casing and the electronic control device case is disposed at a side of the switch case that is located opposite from the automatic transmission casing.

10. A neutral start switch-combined electronic control unit according to claim 7, wherein the electronic control device case and the switch case have overlapping portions that overlap each other within a range corresponding to the locus of rotation of the rotor, in a direction of an axis of the rotation, and relatively low-height elements are disposed on a portion of a surface of the base board facing the overlapping portions of the electronic control device case and the switch case, and relatively tall elements are disposed on a portion of a surface of the base board located outside the overlapping portions of the electronic control device case and the switch case.

11. A neutral start switch-combined electronic control unit according to claim 10, wherein the low-height elements and the tall elements are disposed on both side surfaces of the base board.

12. A control unit for an electronic transmission comprising:

a case enclosing at least one switch and an electronic control unit;

the switch including a rotor pivotally attached to the case, the rotor having electrical contacts located thereon;

the case includes a switch case enclosing the at least one switch, an electronic control case enclosing the electronic control unit and an intermediate wall located between the switch case and the electronic control unit case; and wherein at least one contact is located on a portion of the control unit opposing the electrical contacts.

13. The control unit for an automatic transmission as set forth in claim 12, wherein the electrical contacts are located on a front face of the rotor and a rear face of the rotor.

14. The control unit for an automatic transmission as set forth in claim 12, wherein the electrical contacts are located on only one of the rear face of the rotor and the front face of the rotor.

15. The control unit for an automatic transmission as set forth in claim 12, further comprising sealing means for preventing contaminants from communicating between the switch case and the electronic control unit case.

16. The control unit for an automatic transmission as set forth in claim 15, wherein the contaminants comprise at least one of oil, metal particles and water.

17. The control unit for an automatic transmission as set forth in claim 12, wherein the intermediate wall is configured to prevent contaminants from communicating between the switch case and the electronic control unit case.

18. The control unit for an automatic transmission as set forth in claim 17, wherein the contaminants comprise at least one of oil, metal particles and water.

19. The control unit for an automatic transmission as set forth in claim 12, wherein the electronic control unit includes a removable base board with at least one electronic circuit component thereon.

20. The control unit for an automatic transmission as set forth in claim 19, wherein the base board and rotor are substantially parallel to each other.

21. The control unit for an automatic transmission as set forth in claim 12, further comprising:

a shift linkage connected to a shift lever and to the rotor for allowing a user to rotate the rotor by moving the shift lever and thereby select a driving range for the automatic transmission; and a manual valve linkage connected to a manual valve and to the rotor for placing the automatic transmission into the driving range as selected by the user.

* * * * *